United States Patent [19]

Kallenbach et al.

[11] Patent Number: 5,064,486

[45] Date of Patent: Nov. 12, 1991

[54] COLLOIDAL POLYMER DISPERSION FOR INTERNAL SEALING OF PIPES AND PROCESS FOR THE APPLICATION THEREOF

[75] Inventors: Rolf Kallenbach; Karl-Heinz Lemmert, both of Mannheim, Fed. Rep. of Germany

[73] Assignee: Shell Internationale Research Maatschappij B.V., The Hague, Netherlands

[21] Appl. No.: 563,785

[22] Filed: Aug. 6, 1990

Related U.S. Application Data

[63] Continuation of Ser. No. 285,239, Dec. 16, 1988, abandoned.

[30] Foreign Application Priority Data

Dec. 17, 1987 [GB] United Kingdom ................. 8729447

[51] Int. Cl.$^5$ .............................................. B32B 35/00
[52] U.S. Cl. ........................................ 156/94; 106/33; 427/140; 252/311
[58] Field of Search ................ 427/140; 523/130, 176; 524/802, 823; 252/308, 311; 106/33; 156/94

[56] References Cited

U.S. PATENT DOCUMENTS

| | | | |
|---|---|---|---|
| 2,141,959 | 12/1938 | Skeen | 106/33 X |
| 3,563,823 | 2/1971 | Yie | 427/140 X |
| 4,035,329 | 7/1977 | Wiest et al. | 524/823 X |
| 4,554,178 | 11/1985 | Yamamoto et al. | 427/140 |
| 4,579,259 | 4/1986 | Hirao et al. | 222/389 |
| 4,582,551 | 4/1986 | Parkes et al. | 427/140 X |
| 4,731,982 | 3/1988 | Grant et al. | 106/33 X |
| 4,777,065 | 10/1988 | Hirao et al. | 427/239 |

FOREIGN PATENT DOCUMENTS

| | | | |
|---|---|---|---|
| 90384 | 10/1983 | European Pat. Off. | |
| 0166264 | 1/1986 | European Pat. Off. | 252/311 |
| 2225903 | 12/1973 | Fed. Rep. of Germany | |

OTHER PUBLICATIONS

Gessner G. Hawley, ed., *The Condensed Chemical Dictionary*, 10th ed., (Van Nostrand Reinhold Company, 1981), p. 822.

*Primary Examiner*—Richard D. Lovering
*Assistant Examiner*—Daniel S. Metzmaier

[57] ABSTRACT

Colloidal polymer dispersion for internal sealing of pipe connections containing 1–40% by weight of a water-soluble polyol and 99–60% by weight of an aqueous colloidal polymer dispersion.

6 Claims, No Drawings

COLLOIDAL POLYMER DISPERSION FOR INTERNAL SEALING OF PIPES AND PROCESS FOR THE APPLICATION THEREOF

This application is a continuation of application Ser. No. 07/285,239, filed Dec. 16, 1988 now abandoned.

The invention relates to a colloidal polymer dispersion for internal sealing of pipe connections, especially pipes carrying domestic gas or natural gas. The invention also relates to a process for internal sealing of such connections by applying such a dispersion.

The problem of internal sealing of pipe connections, especially pipes carrying domestic gas or natural gas, has become of considerably more interest in recent times. For reasons of safety and economics, such pipes should be as tight as possible and any leaks should be repaired in a manner as simple, as quick and as safe as possible.

As a result of switching over from town gas to natural gas the problem of internal sealing of pipe connections has become particularly acute, because natural gas is maintained at a considerably higher pressure than town gas. Therefore, the quantities of gas escaping through leaks are larger. Moreover, there is an increased danger of new leaks. Natural gas being dry, the hemp seals in threaded connections and sleeves easily dry out. There are many suggested ways of solving this problem.

DE-OS 32 11 623 concerns a composition to seal pipes internally, which contains a solvent, a binder and a pigment. When this composition is manufactured, the binder is stirred hot into the solvent, whereupon the solution is cooled. Then, the pigment is dispersed into the mixture and comminuted. To seal a pipe internally, the pipe is filled in a vertical position from below with the composition and is subjected for some time to pressure. The composition is then let out and an elastic compressible plastic sponge is blown through the pipe from top to bottom. Finally, the pipe is evacuated. A pressure vessel is used to fill and empty the pipe and to catch the plastic sponge at the end. This known method of sealing is rather complicated.

DE-PS 22 25 903 concerns the use of an aqueous, colloidal polychlorobutadiene dispersion where necessary containing fine fiber dust, in which the polychlorobutadiene has been obtained by means of emulsion polymerisation, the dispersion containing alkali metal salts of resin acids as emulsifier, the resin acids being free from conjugated double bonds. This known dispersion to be used for sealing of leaking pipe systems carrying town gas or natural gas is free from curing agents and accelerators By the choice of a specially prepared polychlorobutadiene and of a special emulsifier dispersions are obtained which ensure complete sealing. However, in practice it has been found that at least two treatments with this dispersion are required to provide a tight seal according to the German DIN 30659, edition July 1980.

A colloidal polymer dispersion for internal sealing of pipe connections has now been found which allows a tight seal according to said DIN method in one single and simple treatment and which dispersion can be prepared in a simple manner.

Accordingly, the invention provides a colloidal polymer dispersion for internal sealing of pipe connections, especially pipes carrying town gas or natural gas, which dispersion may be defined as comprising:

(a) in the range of from 1 to 40% by weight of a water-soluble polyol, and
(b) in the range of from 99 to 60% by weight of an aqueous colloidal polymer dispersion, the percentages being calculated on the total of water, polymer and polyol.

It is a feature of the colloidal polymer dispersion according to the present invention that it may not only be free from curing agents and accelerators, but also from plasticizers.

When using the colloidal polymer dispersion according to the present invention a threaded connection containing hemp or any other suitable fibrous material is sealed and evaporation of water from the hemp or other fibrous material is prevented. The hemp is soaked with the polyol so that the sealing action thereof remains and simultaneous the connection is covered at the inner surface of the pipe with a film of the polymer, thereby preventing the polyol escaping from the hemp. Thus, a pore-free, lasting, gas-tight film is obtained in one single treatment. It may be said that the colloidal polymer dispersion serves as a carrier for the water-soluble polyol.

A sealing liquid only consisting of a polyol, or of a solution of water in the polyol would penetrate into the threaded connection and impregnate the hemp, but after some time all or substantially all of the sealing liquid would be evaporated into or entrained by the gas flowing through the pipe Hence, leaks would inevitably develop.

A sealing composition only consisting of an aqueous colloidal polymer dispersion, a polyol being absent, would not penetrate into the threaded connection and would not penetrate into and impregnate hemp. Hence, the threaded connection would not be sealed.

The polymer present in the colloidal polymer dispersion is insoluble in water which means that solid polymer particles are capable of forming a colloidal dispersion in an aqueous phase. The particles in the colloidal dispersion preferably have a largest size in the range of from 0.01 to 50 $\mu$m; however, a largest size outside this range is not excluded. Such polymer dispersions are readily available commercially. Preference is given to polymers of a vinyl compound, in particular of vinyl acetate and of esters of acrylic acids The alcohol part of these esters preferably has in the range of from 1 to 5 carbon atoms per molecule and is preferably derived from an alkanol. Very good results have been obtained with terpolymers of vinyl acetate, ethylene and esters of acrylic acid Other examples of suitable polymers are homopolymers of esters of acrylic acid, copolymers of styrene and esters of acrylic acid, homopolymers of vinyl acetate, copolymers of vinyl acetate and ethylene, copolymers of vinyl acetate and esters of acrylic acid, copolymers of vinyl acetate and esters of maleic acid, terpolymers of vinyl acetate, vinyl chloride and ethylene, homopolymers of vinyl isobutyl ether, of vinyl methyl ether, of vinyl ethyl ether and of vinyl propionate, copolymers of vinyl propionate and vinyl chloride, copolymers of vinyl propionate and esters of acrylic acid, copolymers of vinyl propionate and Veova 10, and copolymers of vinyl acetate and Veova 10. "Veova 10" is a trade mark for the vinyl esters of a synthetic mixture of mainly tertiary alkanoic acids having 10 carbon atoms per molecule.

The water-soluble polyol preferably has a boiling point at atmospheric pressure of at least 250° C., so as to reduce losses by evaporation to a minimum.

Examples of water-soluble polyols which may be present in the colloidal polymer dispersion according to the present invention are diols, for example ethylene glycol, 1.2.propanediol, 1,3-propanediol, 1,2-butanediol, 1,3-butanediol 1,4-butanediol and pinacol. Examples of polyols having a boiling point of at least 250° C. are triols, for example glycerin and 1,2,3-trihydroxybutane, tetraols, for example pentaerythritol; hexaols, for example sorbitol. Higher-molecular polyols such as those obtained by the addition of ethylene oxide to the polyols mentioned hereinbefore are particularly useful. Water-soluble polyoxypropylene oxides and high molecular weight polyethylene oxides, for example having a molecular weight between 475 and 1,050 or more than 1,050, are also very suitable. Polyglycerin ethers derived from glycerin by dehydration are also suitable. Very good results have been obtained with glycerin.

The colloidal polymer dispersion according to the present invention preferably contains in the range of from 10 to 50% by weight of water and in the range of from 2 to 20% by weight of the water-soluble polyol, calculated on the total of water, polymer and polyol.

The colloidal polymer dispersion according to the present invention may contain additives, such as (a) surface active agents, for example alkali metal salts of or amine salts of alkyl. benzenesulphonic acids, ethoxylated fatty alcohols, ethoxylated alkylphenols or a combination thereof, (b) corrosion inhibitors, for example alkali metal nitrites, derivatives of phosphoric acid and esters of boric acid, (c) germicidal agents, (d) anti-foam agents and (e) dispersion-stabilizing agents.

The invention further provides a process for internal sealing of pipe connections, especially pipes carrying town gas or natural gas, which process comprises applying to the pipe connections a colloidal polymer dispersion which may be defined as comprising: (a) in the range of from 1 to 40% by weight of a water-soluble polyol, and (b) in the range of from 99 to 60% by weight of an aqueous colloidal polymer dispersion, the percentages being calculated on the total of water, polymer and polyol.

The colloidal polymer dispersion according to the present invention can be prepared in a very simple manner by mixing in the range of from 1 to 40% by weight of a water-soluble polyol and in the range of from 99 to 60% by weight of an aqueous colloidal polymer dispersion, the percentages being calculated on the total of water, polymer and polyol.

The following Example further illustrates the invention.

EXAMPLE

A colloidal polymer dispersion according to the present invention had the following composition in per cent by weight:

90.0 plasticizer-free aqueous dispersion of a terpolymer of vinyl acetate, ethylene and an ester of acrylic acid having a content of 60% of terpolymer, according to DIN 53189, 6.0 glycerine.

3.0 a corrosion inhibitor based on an ester of boric acid, and 1.0 a diluted aqueous dispersion of a pigment.

The aqueous dispersion of the terpolymer was a mixture of equal parts by weight of a) a dispersion having a viscosity at 20° C. of about 250 mPa.s according to the Epprecht Rheometer STV/B III, known under the trade mark Vinnapas-Dispersion LT 883, and b) a dispersion having a viscosity at 20° C. of about 2,600 mPa.s according to the Epprecht Rheometer STV/C III, known under the trade mark Vinnapas-Dispersion EAF 60.

The particles in both dispersions had a size of 0.1–0.8 μm. Both dispersions contained a surface active agent.

The aqueous dispersion of the pigment only serves to give the dispersion a colour. It has been obtained by diluting with water a highly concentrated solution known under the trade mark Luconyl.

A 10 m section of pipe from a domestic gas supply line with threaded screw connections had a leak of 5 liter of gas per hour. After removal of any dust, the dispersion was pressed into the section of pipe at a pressure of 5 bar abs. and kept at this pressure for a period of two hours. Then, the dispersion was drawn off and an elastic compressible plastic sponge and then compressed air were blown through the pipe A tightness test was conducted according to DIN method 30659 sections 4 4 to 4 12 and the section was sealed at a pressure of 5 bar. After sealing the section was tested at a pressure of 110 mbar gauge This test was carried out with twelve of such sections. No leaks were found. The same test carried out after four months did not reveal leaks either.

Air dried by contact with silica gel was conducted at a temperature of 23±2° C. in an amount of 100 liters per hour and for a period of 120 hours through the pipe A repetition of the tightness test described hereinbefore revealed that the pipes were still tight.

After keeping the twelve pipe sections for 1000 hours at a temperature of 50° C. the twelve sections were still tight.

The sealed pipes also satisfied the other requirements of DIN 30659, i.e. the resistance against gas condensate, resistance against vibration, resistance against fire, solubility requirements, corrosive action on metals and influence on the burning properties of gas.

The influence of the sealant on nitrile rubber complied with DIN 3535. part 1.

We claim:

1. A process for internal sealing of threaded pipe connections containing a fibrous material which process comprises applying to the pipe connections a colloidal polymer dispersion comprising (a) from 1% to 40% by weight polyol, and (b) from 99 to 60% by weight of aqueous colloidal polymer dispersion wherein the polymer is insoluble in water, the overall water content being in the range of from 10 to 50% by weight (the percentages being calculated on the total of (a) and (b)), the soak said fibrous material with said polyol and form a film of said polymer at inner pipe surface which prevents said polyol from escaping from said fibrous material.

2. The process as claimed in claim 1 wherein the polyol in the colloidal polymer dispersion is selected from the group consisting of water-soluble diols, water-soluble triols, water-soluble tetraols, water-soluble hexaols, water-soluble ethoxylated diols, triols, tetraols and hexaols, water-soluble polyoxypropylene oxides, water-soluble polyethylene oxides and water-soluble polyglycerin ethers.

3. The process as claimed in claim 2 wherein the polymer in the aqueous colloidal polymer dispersion is selected from the group consisting of terpolymers of vinyl acetate, ethylene and esters of acrylic acid, homopolymers of esters of acrylic acid, copolymers of styrene and esters of acrylic acid, homopolymers of vinyl acetate, copolymers and vinyl acetate and ethylene, copolymers of vinyl acetate and esters of acrylic acid, copolymers of vinyl acetate and esters of maleic acid, terpolymers of vinyl acetate, vinyl chloride and ethylene, homopolymers of vinyl isobutyl ether, homopolymers of vinyl methyl ether, homopolymers of vinyl ethyl ether, homopolymers of vinyl propionate, copolymers of vinyl propionate and vinyl chloride, copolymers of vinyl propionate and esters of acrylic acid, and copolymers of vinyl propionate or vinyl acetate and vinyl esters of a synthetic mixture of mainly tertiary alkanoic acids having 10 carbon atoms per molecule.

4. The process of claim 1 wherein said colloidal polymer dispersion comprises (a) from 3% to 40% by weight of said polyol and (b) from 97% to 60% by weight of said aqueous colloidal polymer dispersion.

5. The process of claim 4, wherein said polymer is a polymer of a vinyl compound.

6. The process of claim 1, wherein said polymer is a polymer of a vinyl compound.

* * * * *

UNITED STATES PATENT AND TRADEMARK OFFICE
CERTIFICATE OF CORRECTION

PATENT NO. : 5,064,486

DATED : November 12, 1991

INVENTOR(S) : Rolf Kallenbach, et al

It is certified that error appears in the above-identified patent and that said Letters Patent is hereby corrected as shown below:

Claim 1 (column 4, line 48), after "weight" insert --of a water-soluble--, and after "99" insert --%--.

Claim 1 (column 4, line 50), after "is" delete "insoluble in water "and insert --water-insoluble polymer formed from at least one monomer containing at least one $CH_2=C\langle$ group--.

Signed and Sealed this

Twenty-third Day of February, 1993

Attest:

STEPHEN G. KUNIN

*Attesting Officer*    *Acting Commissioner of Patents and Trademarks*